March 23, 1971     H. A. SHERWIN     3,572,386
MULTI-STAGE POWER VALVE ASSEMBLY
Filed Dec. 13, 1968
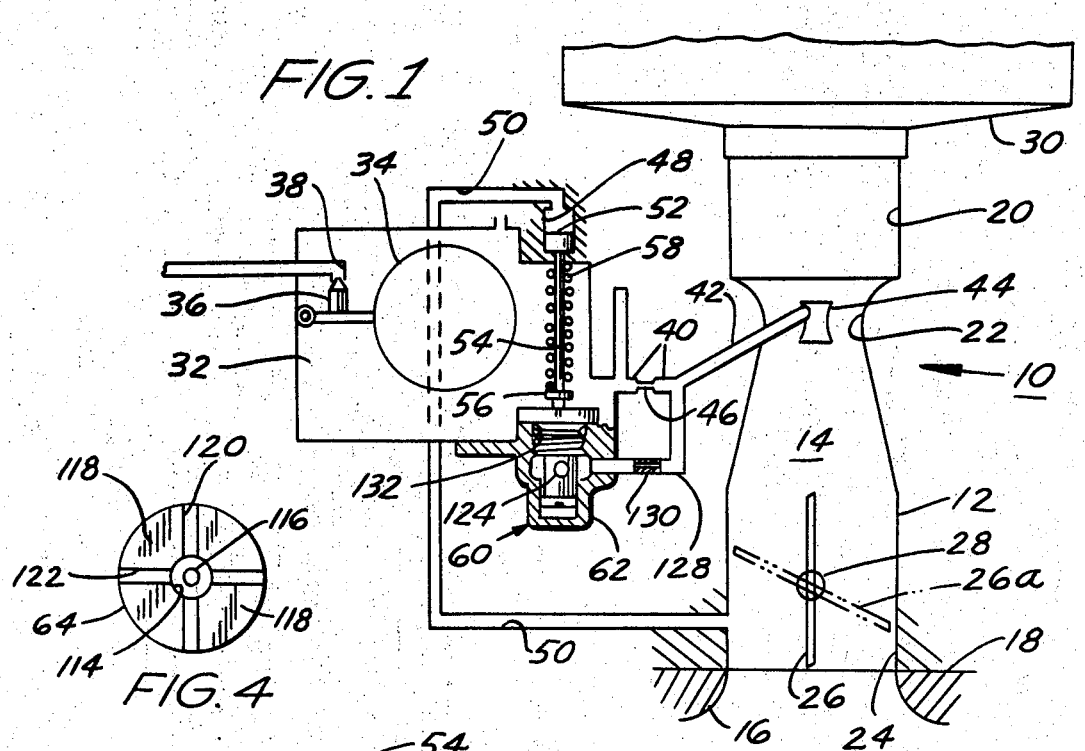
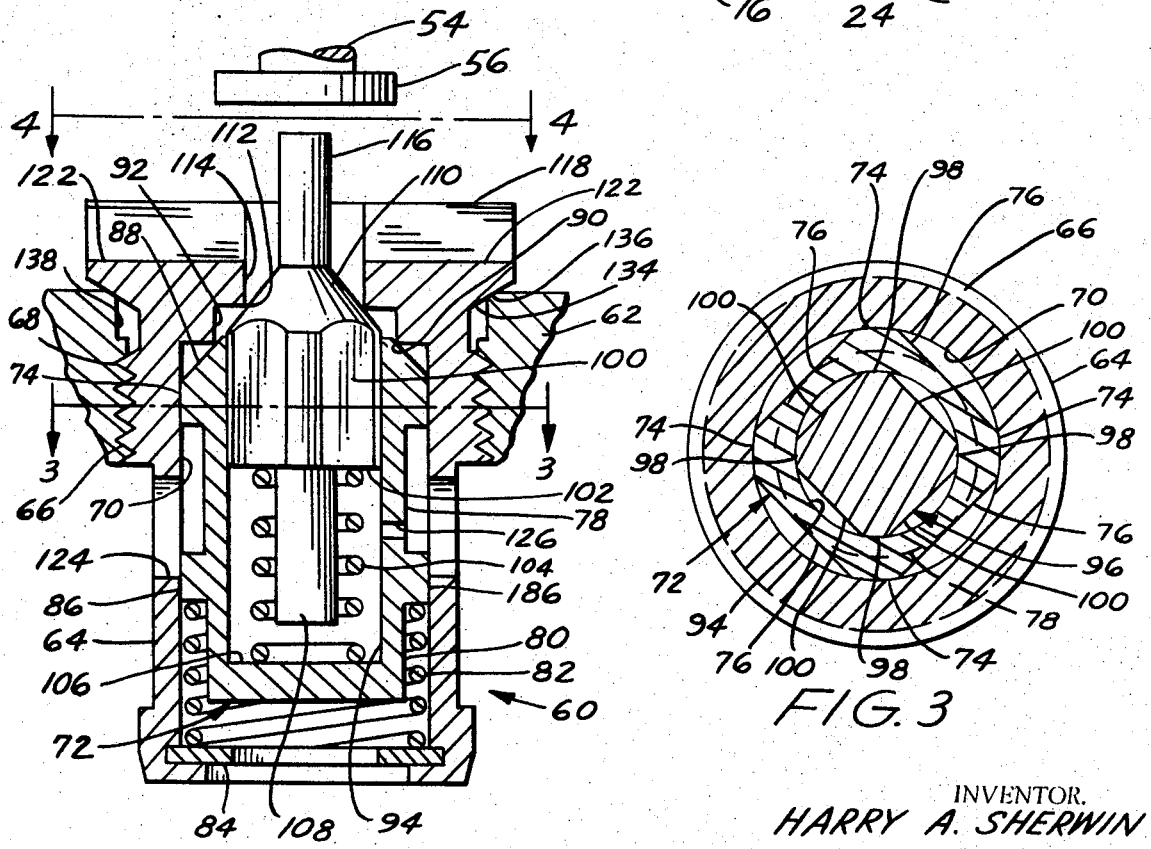
INVENTOR.
HARRY A. SHERWIN
BY
Walter Patoroka, Jr.
ATTORNEY United States Patent Office 3,572,386
Patented Mar. 23, 1971

3,572,386
MULTI-STAGE POWER VALVE ASSEMBLY
Harry A. Sherwin, 11724 Amel Drive,
Warren, Mich. 48093
Filed Dec. 13, 1968, Ser. No. 783,562
Int. Cl. F16k *11/14*
U.S. Cl. 137—630.22                 3 Claims

ABSTRACT OF THE DISCLOSURE

A power valve assembly has a housing with first and second concentrically formed valve seats therein and contains first and second telescoping valve members adapted to respectively cooperate with the first and second seats for controlling flow of fuel therethrough; a first spring tends to move the valves away from each other while a second spring functions to resiliently urge both valves against their respective seats.

BACKGROUND OF THE INVENTION

It has been accepted practice to provide, in carburetor structures, a power fuel enrichment system comprised of a power valve assembly carried by the carburetor in a manner so as to be affected by engine manifold vacuum. The manifold vacuum acting on a movable pressure responsive member, which is adapted for operative engagement with the valving means of the power valve assembly, at idle or normal load conditions, as well as during engine deceleration, is strong enough to overcome a spring resistance so as to maintain the valving means closed. When high power demands place a greater load on the engine and manifold vacuum drops below a predetermined value, the said spring overcomes the reduced vacuum thereby opening the valving means. Consequently, fuel flows through the open valve means and ultimately into the carburetor induction passage thereby enriching the otherwise normal fuel-air mixture. As engine demands are reduced manifold vacuum again increases. The increased vacuum acts on the pressure responsive member to finally overcome the resistance of the said spring thereby closing the valving means and shutting off the added supply of fuel which is no longer required.

The prior art has also suggested that such power valve assemblies be constructed so as to provide such additional fuel in stages instead of providing a single increased rate of fuel flow in order to thereby more closely tailer the increase in fuel flow to the requirements of the engine.

However heretofore such multi-stage power valve assemblies have not been entirely successful because of certain undesirable characteristics. For example, the multi-stage power valve assemblies of the prior art have employed serially positioned valving members each of which coacted with serially situated valve seats. Usually such valve members were not positively guided during their movements toward and away from the valve seats thereby often creating a cocked position of the valve with respect to the seat.

Further, when such serially positioned valves were to be totally actuated, the opening force transmitted to the second valve would have to continually overcome a variable force of an intermediate spring situated between the first valve and a fixed spring seat. This increased the difficulty of attaining precise operating points with respect to which the second valve would open.

Accordingly, the invention herein disclosed and claimed directs itself to the solution of such problems as set out above including others which will become apparent.

SUMMARY OF THE INVENTION

According to the invention, a multi-stage power valve assembly comprises a housing containing two valve members therein which are in generally telescoped relationship so as to be capable of motion relative to each other as well as relative to said housing.

Accordingly, a general object of this invention is to provide a power valve assembly which is capable of providing staged incremental increases in fuel flow therethrough.

A further object of this invention is to provide a power valve assembly which will materially if not totally eliminate fuel leakage therethrough during such periods of operation when the valve members are closed.

Another object of this invention is to provide a sequential valve opening arrangement which will not be adversely affected by multiple spring rates operating collectively during the opening movements of the secondary valving member.

Other objects and advantages of the invention will become apparent when reference is made to the following detailed description considered in conjunction with the accompanying drawings.

DESCRIPTION OF THE DRAWINGS

In the drawings:

FIG. 1 is a diagrammatic view of a carburetor and the fuel system thereof showing, on an enlarged scale, the power valve assembly of the present invention incorporated therein;

FIG. 2 is an enlarged longitudinal cross-sectional view of the power valve assembly, of FIG. 1, constructed in accordance with the teachings of this invention;

FIG. 3 is a cross-sectional view taken generally on the plane of line 3—3 of FIG. 2 and looking in the direction of the arrows; and FIG. 4 is a top plan view, of reduced size, taken generally on the plane of line 4—4 of FIG. 2 and looking in the direction of the arrows.

DESCRIPTION OF PREFERRED EMBODIMENT

Referring now in greater detail to the drawings, FIG. 1 diagrammatically illustrates a carburetor 10 having a body 12 with an induction passage 14 formed therethrough communicating with the passageway 16 of the intake manifold 18, of an associated internal combustion engine, upon which the carburetor 10 is mounted. The induction passage 14 may be comprised of an air inlet 20, a main venturi 22 and a mixture outlet 24 in communication with manifold passageway 16. The flow through the induction passage 14 may be controlled by a throttle valve 26 mounted on a throttle shaft 28 for pivotal rotation therewith so as to be variably positioned as by manual operation thereof. Usually an air cleaner, such as is indicated fragmentarily at 30, is connected to the air inlet.

Fuel is supplied to the induction passage 14 from a reservoir 32, which in the example shown is a float chamber of a fuel bowl having a float 34 therein which actuates a fuel valve 36 controlling a fuel inlet 38 leading from any suitable source of supply.

The fuel flows from reservoir or fuel bowl 32 through a conduit 40 to the main fuel nozzle 42 which discharges at the throat of the main venturi 22. A second venturi 44 may be provided to form a discharge member for the main nozzle. A metering restriction 46 is provided in conduit means 40, as is the usual practice, and an idling fuel passage (not shown) of any suitable construction, may lead from the conduit means 40 to discharge adjacent the edge of the throttle valve 26 when in its closed position as shown in phantom lines at 26a. Suitable acceleration pump mechanism, as well as check valves, vents and metering orifices may be provided, as is well known in the art.

The power valve or economizer assembly actuating mechanism comprises a cylinder 48 connected as by a duct or conduit 50 to the induction passage 14 of the carburetor 10 posterior to the throttle valve 26 when the throttle valve is in its closed position. A piston 52 within cylinder 48 is thusly subjected to the manifold vacuum which tends to move it upwardly. A push rod 54, fixed at one end to piston 52, depends downwardly therefrom terminating in a shoe 56 which acts as a seat for a compression spring 58 which, in turn, yieldingly urges the shoe 56 and piston 52 downwardly against the force of the manifold vacuum.

As shown in both FIGS. 1 and 2, a multi-stage power valve or economizer assembly 60 is situated within a casing or housing portion 62 of the structure generally defining the reservoir 32. The power valve assembly 60 is illustrated as being comprised of a generally tubular housing 64 having formed thereon an externally threaded portion 66 for threadably engaging an internally threaded portion 68 of the casing structure 62. A cylindrical bore 70 in housing 64 slidably receives therein a sleeve-like valve 72 which, as viewed in FIG. 3, is generally of a square cross-section having the corners thereof arcuately shaped, as at 74 to closely conform to the surface of bore 70. As will be seen, the clearance between sides 76 of sleeve valve 72 and bore 70 provides space for the flow of fuel therebetween.

An intermediate portion of the sleeve valve 72 may be formed so as to have a somewhat relieved axially extending cylindrical outer surface 78 which, if desired may blend with or be tangent to the sides 76. Similarly, the lower end of sleeve valve 72 may also be provided with a second cylindrical surface 80 which will be accommodated within a coiled compression spring 82 having one end seated as against a washer-like member or snap ring 84, retained by housing 64, and the other end bearing against the resulting flange-like portions 86 intermediate cylindrical surfaces 78 and 80.

Spring 82 serves to move sleeve valve 72 upwardly in bore 70 so as to normally cause a frusto-conical valving portion or surface 88 to be in seated or closed relationship with a valve seat 90 defining therewithin an orifice or conduit portion 92.

Sleeve valve 72 also has a bore 94 formed therein with the upper end thereof open so as to slidably receive therein a second valve member 96 which, as also shown in FIG. 3, is generally of a square cross-section having the corners thereof arcuately shaped, as at 98, to closely conform to the surface of bore 94. As will also be seen, the clearance between sides 100 of valve body 102 and bore 94 provides space for the flow of fuel therebetween.

A second coiled compression spring 104, having one end seated against the closed end portion 106 of sleeve valve 72, is received about a downwardly depending extension 108, carried by valve body 102, in a manner causing said body 102 to be resiliently biased upwardly causing a generally conical valving surface 110 on the upper end of valve body 102 to be brought into seated or closed contact with a cooperating valve seat 112 formed generally peripherally about a conduit portion 114. A second upwardly directed extension or plunger 116 carried by valve body 102 extends through conduit 114 so as to have the upper end thereof substantially above the upper end surface 118 of valve housing 64. As seen in both FIGS. 2 and 4, the upper surface 118 preferably has intersecting grooves or slots 120 and 122 formed therein so as to accommodate, for example, a bladed tool for rotatingly driving the valve housing 64 into seated engagement with casing portion 62 and to provide a fuel flow path when shoe 56 engages surface 118.

As can be seen in FIG. 2, a first plurality of relatively small radially directed apertures or conduit portions 126 are formed through the wall of sleeve valve 72 while a plurality of relatively large radially directed apertures or conduit portions 124 are formed through the wall of housing 64 so as to be in continual communication with conduit means 128 formed generally in the casing portion 62. Conduit 128, which preferably contains a second metering restriction 130 therein, serves to communicate between the discharge apertures 124 of power valve assembly 60 and the main fuel discharge nozzle 42 at a point therein which is downstream of the main restriction 46 in conduit 40.

OPERATION

Generally, it is well known in the art that the value of manifold vacuum generated by the engine will vary depending on such factors as engine speed, road load and throttle valve position. For example, with the engine operating at idle, a relatively high value of manifold vacuum will be generated because, at such time, the throttle valve 26 is in its nominally closed position illustrated in phantom line at 26a. During such time, as is well known in the art, the principal means for supplying fuel to the induction passage 14 and intake manifold 16 is by suitable conduitry and metering means collectively referred to as the idle fuel system. Such idle fuel systems as well known in the art and, for purposes of clarity, are not illustrated herein since the practice of the invention is not in any way limited to or by an associated idle fuel system. During such idle engine operation the manifold vacuum may be of a value in the order of 16.0 to 19.0 inches of mercury (Hg).

As the vehicle is started into motion by the movement of the throttle valve 26 (in the clockwise direction in FIG. 1) in the opening direction, the load placed on the engine increases and because of the throttle valve 26 being moved toward a more fully opened position the value of the manifold vacuum decreases. The amount of decrease will depend on the load placed on the engine as well as the rapidity with which the throttle valve 26 is rotated from its nominally closed position toward a more fully opened position. If the engine load is sufficiently great and the opening movement of the throttle is sufficiently rapid, the manifold vacuum may, during this time, decrease to a value in the order of 1.0 to 4.0" Hg.

Further, when the vehicle is decelerating with the throttle valve nominally colsed and the vehicle driving the engine, the value of the generated manifold vacuum may well substantially exceed that established at idle engine operation and be in the order of 21.0 to 22.0" Hg.

Accordingly, it can be seen that manifold or engine-generated vacuum is related to engine operation and as such may be employed as not only an actuating force but also as a control parameter for related devices. Further, it can be seen that cylinder 48 and one side of piston 52 will be exposed to manifold vacuum of a varying value, depending upon throttle position and engine load, by virtue of the communication established by conduit 50.

The main fuel system, for example comprising restriction 46, conduit 40 and main nozzle 42 serves to supply fuel to the induction passage 14 generally during normal off-idle engine operation, as is well known in the art. Further, the manifold vacuum acting on piston 52 at conditions of idle, normal load conditions or deceleration is sufficient to overcome the force of spring 58 thereby holding shoe member 56 off plunger 116. However, when demands for higher power place a greater load on the engine and manifold vacuum decreases below a predetermined value, spring 58 overcomes the pressure differential across piston 52 and moves rod 54 and shoe 56 downwardly against valve plunger 116 sufficiently to unseat valve member 96 and sleeve valve member 72 thereby enabling fuel to flow out of reservoir 32 through conduit 114 and the spaces between the valves 72 and 96 as well as bore 70 through conduits 126 and discharge orifices 124 to conduit 128 from where it flows to main fuel nozzle passage 42. The rate of fuel flow from the fuel bowl chamber or reservoir 32 to main well or conduit 42 being thusly increased by the opening of the power valve assembly 60 causes an enrichment of the flow through the main fuel discharge nozzle 42 resulting in, of course, the ultimate enrichment of the fuel-air mixture being supplied to the induction passage 14 and intake manifold passageway 16. As engine power demands are reduced, manifold vacuum increases; when the vacuum has sufficiently increased, the pressure differential created across piston 52 overcomes the force of spring 58 and again closes valves 72 and 96 against their respective seats 90 and 112 terminating the flow of fuel therethrough. This results in the rate of fuel flow being again controlled primarily by the effects of restriction 46.

The preceding is, of course, a general statement of the over-all operation of the main fuel metering system and the correlated operation of the power valve assembly in the fuel enrichment system. However, the following is a more detailed description of the fuel enrichment system, especially the power valve assembly 60 of the invention.

In view of the preceding it is of course apparent that rod 54 and shoe 56 will not always move downwardly to their maximum stroke position. That is, the distance of downward movement of rod 54 and shoe 56 will depend on the value of manifold vacuum, the pre-load as well as the spring rate of compression spring 58 and the pre-loads and spring rates of both springs 82 and 104 of of power valve assembly 60.

Accordingly, the action of power valve assembly 60 can best be appreciated if its operation is considered relative to incremental changes in the value of manifold vacuum. For example, when a predetermined value of manifold vacuum is experienced by piston 52, rod 54 and shoe 56 will have moved, because of spring 58, to a position of abutting engagement with the upper end of extension or plunger 116. A further reduction in the value of manifold vacuum causes a progressive further downward movement of rod 54, shoe 56 and inner or first stage valve member 96. Such downward movement of valve member 96 is not initially accompanied by a corresponding movement of the sleeve or second stage valve 72 because the relative pre-loads as well as the spring rates of springs 104 and 82 are such as to keep valve surface 88 seated against valve seat 90 while permitting downward movement of first stage valve 96.

As inner valve 96 is thusly opened, fuel from reservoir 32 flows through conduit 114, in communication therewith, between valve surface or valving portion 110 and opened valve seat 112 and into conduit portion or chamber 92 defined generally within seat 90. At this time secondary valve 72 is still maintained closed against cooperating valve seat 90 by the pre-load force of spring 82. Consequently, the fuel which flows into conduit portion or chamber 92, being unable to flow between valving surface 88 and seat 90, flows through the spaces between sides 100 of primary valve body 102 and bore 94 of secondary valve 72 downwardly filling the bore 94 beneath valve body 102. From there the fuel flows through conduits or orifices 126 and out of the discharge orifices 124 into, for example, an annulus 132 formed in casing 62 from where the fuel flows through conduit 128 into the main nozzle conduit 42.

It should be mentioned that during this time, orifice 126 functions as a metering restriction. That is, the flow through primary orifice 126 is such as to be less than that rate of flow at which restriction 130 will exhibit any substantial metering function. While there could be more than one orifice 126, a single orifice is preferred so as to eliminate duplication of orifice sizing.

The downward movement of only primary valve 96 will continue, with accompanying decreasing values of manifold vacuum, until such time as the lower extension 108 of primary valve 96 abuts against the closed end portion 106 of outer valve 72.

After axail abutting engagement between valves 96 and 72 is thusly achieved, further reductions in the value of manifold vacuum is accompanied by rod 54, shoe 56 and spring 58 urging both inner and outer valves 96 and 72 downwardly against compression spring 82. As outer or secondary valve 72 is thereby moved downwardly, the valving surface 88 thereof moves away from coacting seat 90 thereby permitting the fuel in conduit 114 and conduit portion 92 to have a second flow path between valve surface 88 and seat 90. The fuel passing therebetween continues to flow through the spaces between sides 76 of secondary valve 72 and bore 70 of housing 64. Such fuel then flows through discharge orifices or ports 124 into the annulus 132 and through conduit 128 and the main nozzle conduit 42. During this period of operation fuel is flowing through both described paths within the multi-stage power valve assembly 60. As has been previously stated, a restriction 130 is preferably provided within the conduit means 128 so as to thereby provide a metering function to the fuel flowing therethrough when both primary and secondary valves 96 and 72, respectively, are opened. This restriction 130 of course then tailors the rate of additional fuel flow to the requirements of the particular engine with which the carburetor and power valve are associated.

In view of the preceding it should be apparent that the power valve assembly of the invention provides a structure whereby the rate of additional fuel flow to the engine, in order to enrich the fuel-air mixture in the induction passage 14, is applied in stages so that the rate of such additional fuel flow is more nearly the exact quantity of additional fuel which is required for that particular condition of engine operation.

The preferred embodiment of the invention herein described also discloses major advantages which further enhance the operation of the power valve assembly as well as significantly contribute to the ease of fabrication and therefore a reduction in the cost thereof.

The first of such advantages is the formation of a somewhat frusto-conical downward surface 134 formed near the upper end of and on housing 64. It has been found that when a housing 64 so provided with a conical surface 134 is turned down into the casing 62 so as to cause surface 134 to tightly engage and seat against the corner-like portion 136 of the general bore 138 in casing 62 that a separate seal therebetween is more often than not made unnecessary and that no leakage of fuel is experienced therebetween. This, of course, results in the reduction of the over-all cost of such a power valve assembly and fuel enrichment system.

Another major advantage of the invention is that, contrary to prior art structures, both primary valve 96 and secondary valve 72 are completely guided throughout their respective full strokes of movement. This, of course, prevents cocking of the respective valves especially at such critical times as when complete seating of the valves is required. Such guiding is accomplished by having the primary valve slidably guided within the bore of the secondary valve and, in turn, having the secondary valve guided within the bore of housing 64.

Another advantage of the invention is the ability, because of the relationship of valves 72 and 96, to have a multi-stage power valve assembly of an over-all length substantially shorter than that of the prior art where two separate valves are arranged in general series relationship with each other. This again is the result of situating one valve physically within the other valve. The over-all length of such multi-stage power valves is becoming a factor because the packaging of various engine accessories within the engine compartment is more critical with the continuing limitations placed on the space thereof due to styling requirements.

Further, contrary to the prior art, the construction of the invention enables the formation of concentric valve seats 90 and 112 within housing 64 because, during fabrication thereof, a single tool with dual cutter diameters may be employed for the simultaneous machining of both seats 90 and 112. In the prior art, where serially situated valves are employed, it becomes necessary to machine each seat separately thereby introducing some degree of eccentricity between such seats. Such eccentricity when coupled especially with unguided valve members usually results in a high degree of fuel leakage during periods when such valves are supposed to be closed.

Yet another major advantage of the invention is the ability to employ a single or unitary housing 64. The prior art structures, of necessity, require the housing to be of multi-section thereby again introducing misalignment between the cooperating elements as well as increasing the manufacturing costs.

Still another important advantage of the invention is the fact that it makes it easier to determine and attain the precisely chosen point of opening of the secondary valve 72. This is achieved by having the spring rate of spring 104 taken out of the system before opening of the secondary valve 72 is initiated. This, of course, results because of the relative pre-loads and spring rates of springs 104 and 82. Accordingly, once extension 108 abuts against end 106 of valve 72, spring 104 is no longer a factor in determining the point at which secondary valve 72 will open since the opening thereof will be controlled solely by existing pre-load and spring rate of spring 82.

Although only one preferred embodiment of the invention has been disclosed and described, it is apparent that other embodiments and modifications of the invention are possible within the scope of the appended claims.

What I claim as my invention is:

1. A multi-stage power valve assembly, comprising a housing, an axially extending bore formed in said housing, an inlet formed in said housing communicating with said bore, an outlet formed through a wall of said housing communicating with said bore, a first relatively small valve seat formed in said housing generally about said inlet, a second relatively large valve seat formed in said housing generally about said inlet, first and second valve members telescopingly arranged with respect to each other and slidably received within said bore, spring means carried within said housing for continually resiliently urging said first and second valve members into respective seating engagement with said first and second valve seats in order to thereby preclude fluid flow through said inlet and into said bore, abutment means caried by said first valve member, said abutment means comprising an axially extending stop portion adapted to abutably engage said second valve member after said first valve member has been moved a predetermined distance away from said first valve seat, wherein said spring means comprises a first spring member situated within said bore and operatively engaging at its respective opposite ends said housing and said second valve member, and a second spring member situated within said second valve member and operatively engaging at its respective opposite ends said second valve member and said first valve member, said second spring being situated generally about said axially extending stop portion and having a pre-load force significantly less than the pre-load force of said first spring member.

2. A multi-stage power valve assembly, comprising a housing, an axially extending bore formed in said housing, an inlet formed in said housing communicating with said bore, an outlet formed through a wall of said housing communicating with said bore, a first relatively small valve seat formed in said housing generally about said inlet, a second relatively large valve seat formed in said housing generally about said inlet, first and second valve members telescopingly arranged with respect to each other and slidably received within said bore, spring means carried within said housing for continually resiliently urging said first and second valve members into respective seating engagement with said first and second valve seats in order to thereby preclude fluid flow through said inlet and into said bore, passage means formed between said first and said second valve members to permit fluid flow therebetween whenever said first valve member is caused to be moved away from said first valve seat, restrictive orifice means formed through said second valve member so as to permit a metered rate of flow therethrough and through said outlet of said fluid flowing through said passage means, including second passage means formed between said second valve member and said housing to permit fluid flow therebetween whenever said second valve member is caused to be moved away from said second valve seat, said second passage means communicating with said outlet in order to convey said fluid flowing through said second passage means to said outlet, including abutment means carried by said first valve member, said abutment means comprising an axially extending stop portion adapted to abutably engage said second valve member when said first valve member has been moved a predetermined distance away from said first valve seat, wherein said spring means comprises a first spring member situated within said bore and operatively engaging at its respective opposite ends said housing and said second valve member, a second spring member situated within said second valve member and operatively engaging at its respective opposite ends said second valve member and said first valve member, said second spring member being situated generally about said stop portion and having a pre-load force significantly less than the pre-load force of said first spring member, including a valve plunger portion carried by said first valve member generally axially thereof, said plunger portion normally extending through said inlet so as to terminate at a free end a substantial distance away from said housing, said plunger being effective to be at times engaged by an associated actuating member in order to affect movement of said first valve member and said second valve member away from said respective first and second valve seats, said axially extending stop portion being effective to cause movement of said second valve member against the resistance of said second spring member corresponding to the movement of said first valve member in excess of said predetermined distance.

3. A multi-stage power valve assembly according to claim 2 wherein said second valve member comprises a sleeve-configuration having one open end about which is formed an annular conical-like valving surface, wherein said first valve member is slidably received through said one open end in a manner so as to have a second annular-like valving surface formed thereon projecting beyond said annular conical-like valving surface of said second valve member when said first and second valve members are respectively in engagement with said first and second valve seats.

References Cited
UNITED STATES PATENTS

| | | | |
|---|---|---|---|
| 1,580,618 | 4/1926 | Lovequist | 137—630.22 |
| 2,067,445 | 1/1937 | Ginter | 137—630.22 |
| 2,392,741 | 1/1946 | Hurlburt | 137—630.22 |
| 2,557,378 | 6/1951 | Granberg | 137—630.14 |
| 2,936,784 | 5/1960 | Putz | 137—630.22 |
| 3,114,391 | 12/1963 | Kurtz | 137—630.14X |
| 3,213,887 | 10/1965 | Angelery | 137—630.15 |
| 3,411,521 | 11/1968 | Johnson | 137—630.15X |

CLARENCE R. GORDON, Primary Examiner

U.S. Cl. X.R.

123—103, 198; 137—630.14